(12) United States Patent
Uehara et al.

(10) Patent No.: US 9,005,838 B2
(45) Date of Patent: Apr. 14, 2015

(54) FUEL CELL STACK

(75) Inventors: Shigetaka Uehara, Kamakura (JP); Yasuhiro Numao, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 308 days.

(21) Appl. No.: 13/127,842

(22) PCT Filed: Nov. 13, 2009

(86) PCT No.: PCT/IB2009/007457
§ 371 (c)(1),
(2), (4) Date: May 5, 2011

(87) PCT Pub. No.: WO2010/058258
PCT Pub. Date: May 27, 2010

(65) Prior Publication Data
US 2011/0236784 A1    Sep. 29, 2011

(30) Foreign Application Priority Data
Nov. 19, 2008  (JP) ................................. 2008-295450

(51) Int. Cl.
 *H01M 2/20* (2006.01)
 *H01M 8/02* (2006.01)
 *H01M 8/24* (2006.01)
 *H01M 8/10* (2006.01)

(52) U.S. Cl.
 CPC .......... *H01M 8/0273* (2013.01); *H01M 8/0254* (2013.01); *H01M 8/242* (2013.01); *H01M 2008/1095* (2013.01); *Y02E 60/50* (2013.01)

(58) Field of Classification Search
 CPC .................................... H01M 8/0254
 USPC .................... 429/460, 467–470, 507–511
 See application file for complete search history.

(56) References Cited

U.S. PATENT DOCUMENTS

| 4,748,092 A | 5/1988 | Hekal |
| 5,776,624 A * | 7/1998 | Neutzler ...................... 429/437 |
| 6,840,969 B2 * | 1/2005 | Kobayashi et al. .......... 29/623.2 |

(Continued)

FOREIGN PATENT DOCUMENTS

| CA | 2 233 440 C | 9/1998 |
| CA | 2 636 055 | 7/2007 |

(Continued)

OTHER PUBLICATIONS

Matbase, Data Table for: Polymers: Elastomers: Silicone Rubber, Dec. 13, 2007, http://www.matbase.com/material/polymers/elastomers/silicone-rubber/properties.*

(Continued)

*Primary Examiner* — Milton I Cano
*Assistant Examiner* — Jimmy K Vo
(74) *Attorney, Agent, or Firm* — Drinker Biddle & Reath LLP

(57) ABSTRACT

A fuel cell stack is provided in which a plurality of single cells each including a membrane electrode assembly are stacked in a stacking direction. The fuel cell stack includes a plurality of electrical insulation members each connected to an outer peripheral portion of a corresponding one of the membrane electrode assemblies. The fuel cell stack further includes a first displacement absorbing member disposed between each insulation member and an adjacent insulation member.

15 Claims, 7 Drawing Sheets

(56) References Cited

U.S. PATENT DOCUMENTS

| | | |
|---|---|---|
| 2005/0118481 A1 | 6/2005 | Sakano et al. |
| 2008/0206622 A1 | 8/2008 | Mitsuta |
| 2009/0004540 A1 * | 1/2009 | Shizuku et al. ............... 429/35 |

FOREIGN PATENT DOCUMENTS

| | | | |
|---|---|---|---|
| CN | 1459134 A | 11/2003 | |
| JP | 07-249417 | 9/1995 | |
| JP | 07249417 | * 9/1995 | |
| JP | 2001-126749 | 5/2001 | |
| JP | 2004-006419 | 1/2004 | |
| JP | 2005-093394 | 4/2005 | |
| JP | 2006-092924 | 4/2006 | |
| JP | 2007-066766 | 3/2007 | |
| JP | 2007-184223 | 7/2007 | |
| JP | 2007-200700 | 8/2007 | |
| JP | 2007-207644 | 8/2007 | |
| JP | 2008-171615 | 7/2008 | |
| WO | WO 2007083214 A1 * | 7/2007 | ............ H01M 8/02 |

OTHER PUBLICATIONS

Science and Engineering Encyclopedia, Phenolic Resin, Apr. 21, 2006, http://www.diracdelta.co.uk/science/source/p/h/phenolic%20resin/source.html.*

* cited by examiner

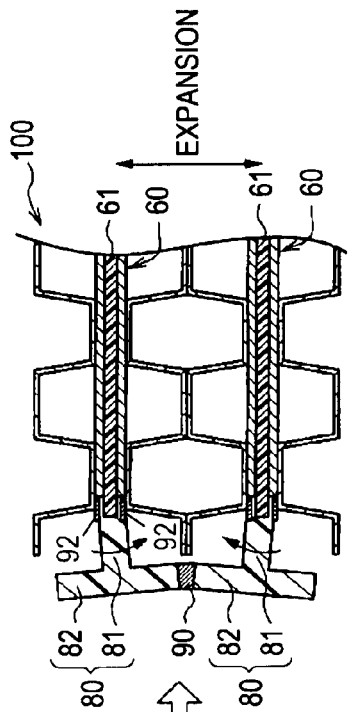
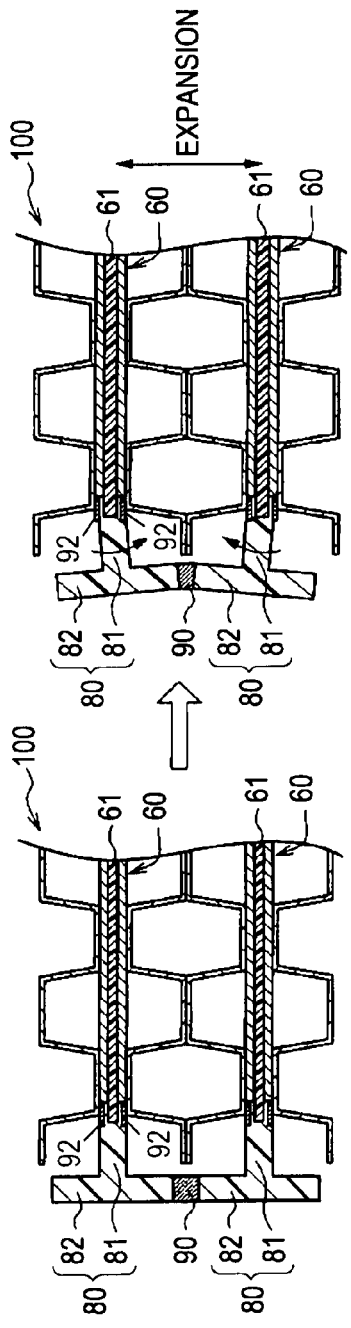
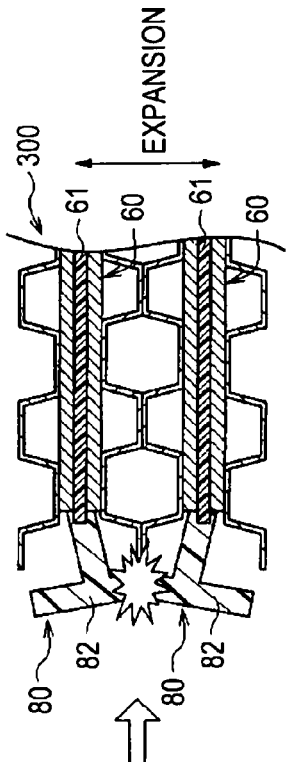
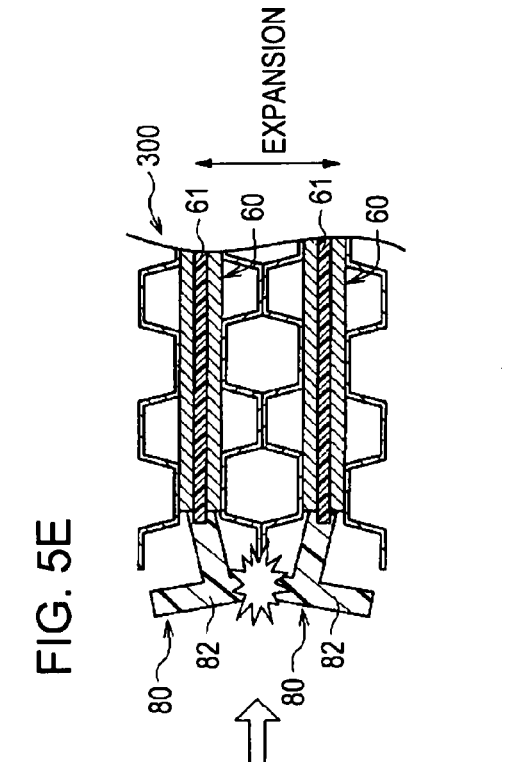
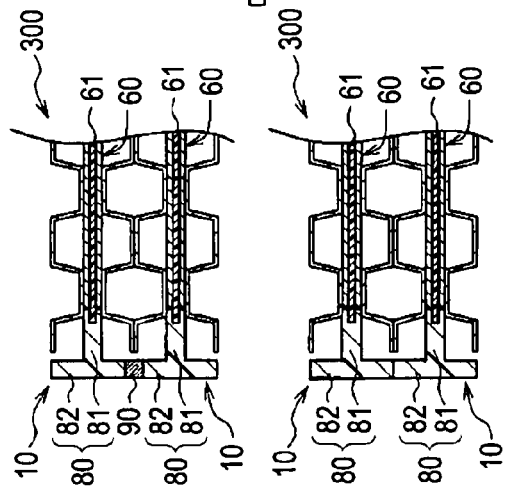

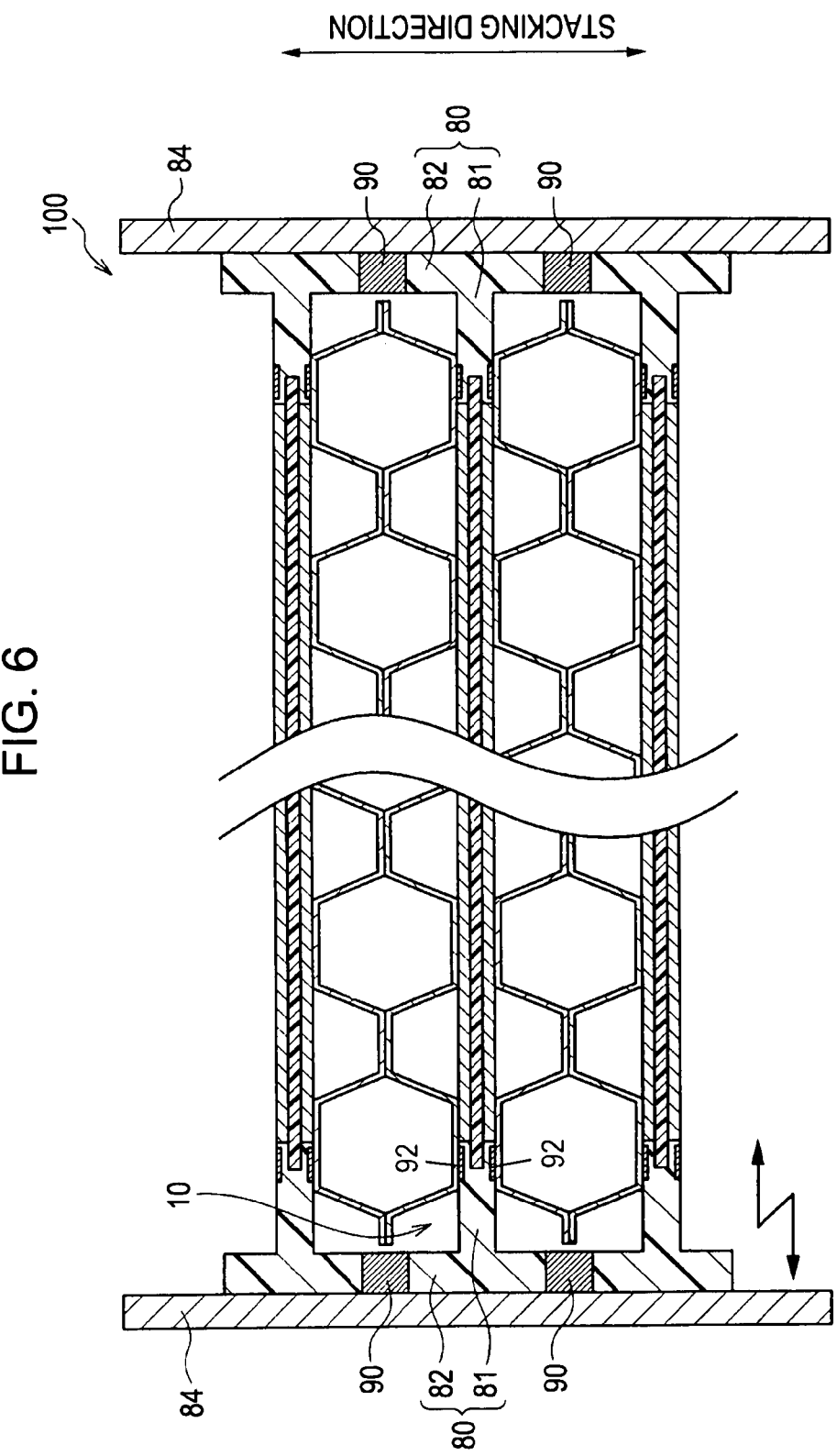

FUEL CELL STACK

CROSS-REFERENCE TO RELATED APPLICATIONS

This application claims priority to Japanese Patent Application No. 2008-295450 filed Nov. 19, 2008, which is incorporated by reference herein in its entirety.

BACKGROUND OF THE INVENTION

1. Field of the Invention

The present invention relates to the structure of a fuel cell stack.

2. Description of the Related Art

A fuel cell, which directly converts chemical energy to electric energy by utilizing electrochemical reaction of reaction gases including an anode gas such as hydrogen and a cathode gas such as oxygen, has been well known.

Japanese Unexamined Patent Application Publication No. 2006-92924 discloses a solid polymer electrolyte fuel cell stack including a plurality of single cells. Each of the single cells includes a membrane electrode assembly (hereinafter referred to as "MEA") and separators disposed on both sides of the MEA. The MEA has an anode electrode and a cathode electrode sandwiching an electrolyte membrane therebetween. In the outer periphery of the fuel cell stack, insulating resin members are formed so that the stacked single cells can be joined to each other and insulation from the outside can be ensured.

However, in the fuel cell stack described in Japanese Unexamined Patent Application Publication No. 2006-92924, the plurality of single cells and the resin members are integrally formed. Therefore, when the electrolyte membranes of the MEAs swell and the fuel cell stack expands in the direction in which the single cells are stacked (hereinafter referred to as "the stacking direction"), the resin members cannot follow displacement of the fuel cell stack, or in other words, displacements between the plurality of MEAs. This may cause resin members to crack. If the resin members crack, water vapor generated in the MEAs may leak out from the inside of the fuel cell stack to the outside, a liquid junction may be generated, and insulation performance of the fuel cell stack may deteriorate.

SUMMARY OF THE INVENTION

The present invention provides a fuel cell stack in which insulation performance is restrained from deteriorating.

In one embodiment, a fuel cell stack is provided in which a plurality of single cells each including a membrane electrode assembly are stacked in a stacking direction. The fuel cell stack includes a plurality of insulation members each connected to an outer peripheral portion of a corresponding one of the membrane electrode assemblies. The plurality of insulation members are electrically insulating. The fuel cell stack further includes a first displacement absorbing member disposed between each insulation member and an adjacent insulation member.

In another embodiment, a fuel cell stack is provided in which a plurality of single cells are stacked in a stacking direction. The fuel cell includes a plurality of membrane electrode assemblies each including an electrolyte membrane and outer peripheral members configured and arranged to absorb displacement between the plurality of membrane electrode assemblies. Each of the outer peripheral members is connected to an outer peripheral portion of a corresponding one of the plurality of membrane electrode assemblies.

In another embodiment, a fuel cell stack is provided including a plurality of membrane electrode assemblies and displacement absorbing means for absorbing displacements between each of the membrane electrode assembly and an adjacent membrane electrode assembly and for supporting the plurality of membrane electrode assemblies at outer peripheral portions thereof.

When the electrolyte membranes of the membrane electrode assemblies swell, the first displacement absorbing members, the outer peripheral members, or the displacement absorbing means deform so that the insulation members can follow displacement of the fuel cell stack in the stacking direction, whereby the insulation members are prevented from cracking.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

FIGS. 5A to 5E illustrate states of insulation members when the fuel cell stack expands in the stacking direction;

FIG. 6 is a partial sectional view of single cells of a fuel cell stack of a second embodiment in the stacking direction.

DESCRIPTION OF THE PREFERRED EMBODIMENTS

Embodiments of the present invention are described below with reference to the drawings.

First Embodiment

A fuel cell system directly converts chemical energy of fuel to electric energy. In a fuel cell system, an electrolyte membrane is sandwiched between an anode electrode and a cathode electrode. The anode electrode is supplied with anode gas including hydrogen, and the cathode electrode is supplied with cathode gas including oxygen. The following electrochemical reactions occur on the surfaces of the anode electrode and the cathode electrode in contact with the electrolyte membrane, so that electric energy is obtained from the electrodes.

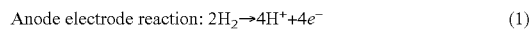

Anode electrode reaction: $2H_2 \rightarrow 4H^+ + 4e^-$ (1)

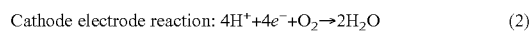

Cathode electrode reaction: $4H^+ + 4e^- + O_2 \rightarrow 2H_2O$ (2)

Figure 1:
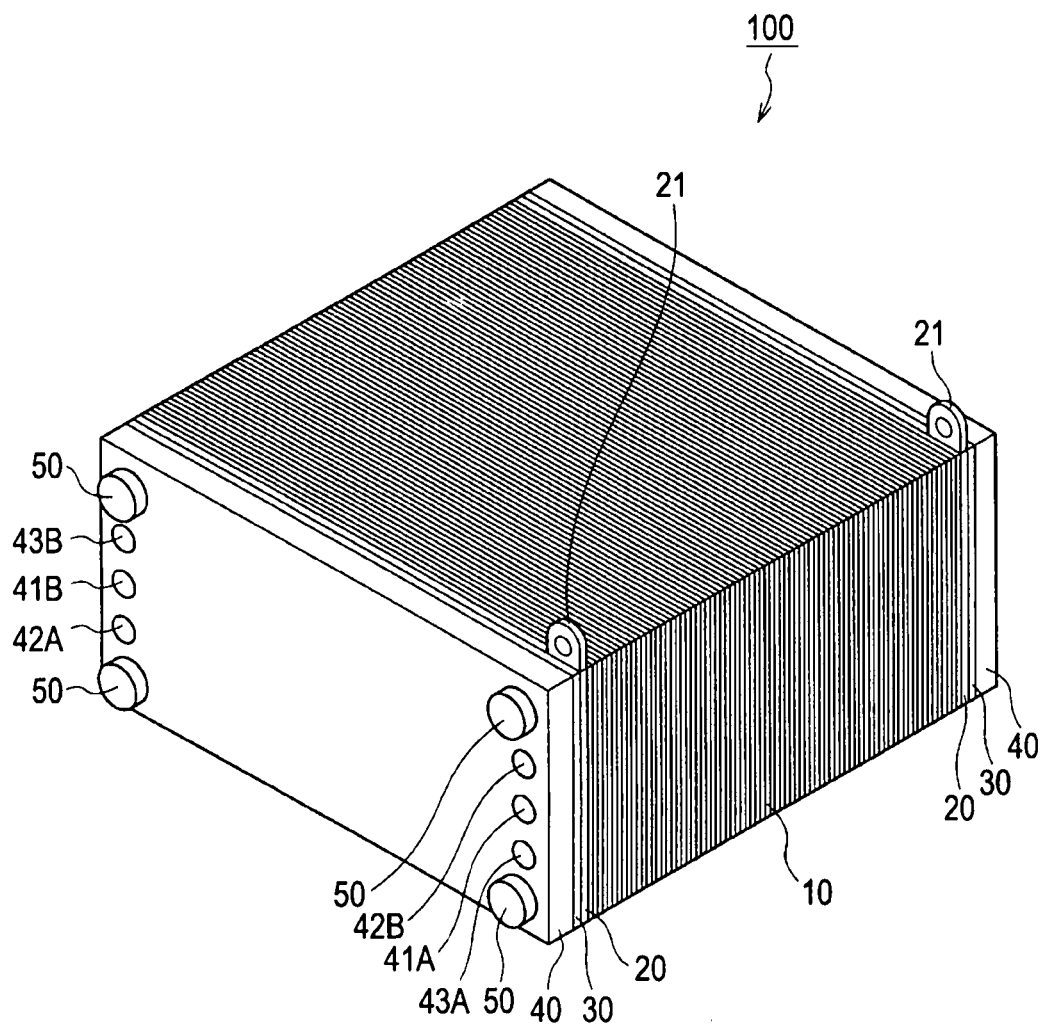
FIG. 1 is a schematic view of a fuel cell stack of a first embodiment.

FIG. 1 shows a fuel cell stack 100, which is a fuel cell system used for a mobile vehicle such as an automobile.

The fuel cell stack 100 includes a plurality of single cells 10, a pair of collector plates 20, a pair of insulation plates 30, a pair of end plates 40, and nuts 50 screwed into tension rods (not shown).

The single cells 10, which generate electromotive force, are unit cells of a solid polymer electrolyte membrane fuel cell type. The fuel cell stack 100 includes a stack of the single cells 10. The structure of the single cell 10 is described below in detail with reference to FIG. 2.

Each of the pair of collector plates 20 is disposed on an outer surface of the stack of the single cells 10. The collector plates 20 are made of gas-impermeable electroconductive material such as compact carbon. Each of the collector plates 20 has an output terminal 21 on an upper side thereof. The fuel cell stack 100 outputs electrons generated in the single cells 10 through the output terminals 21.

Each of the pair of insulation plates 30 is disposed on an outer surface of a corresponding one of the collector plates 20. The insulation plates 30 are made of insulating rubber.

Each of the pair of end plates 40 is disposed on an outer surface of a corresponding one of the insulation plates 30. The end plates 40 are made of metal or resin material having rigidity. One of the end plates 40 includes a cooling water inlet 41A, a cooling water outlet 41B, an anode gas inlet 42A, an anode gas outlet 42B, a cathode gas inlet 43A, and a cathode gas outlet 43B.

The nuts 50 are disposed on outer surfaces of the pair of end plates 40 at positions near the four corners of each of the end plates 40. The nuts 50 are screwed into ends of each of the tension rods extending through the fuel cell stack 100. The fuel cell stack 100 is fastened in the stacking direction by the tension rods and the nuts 50. In order to prevent a short-circuit between the single cells 10, the surfaces of the tension rods are insulated.

Alternatively, the fuel cell stack 100 may be fastened in the stacking direction by using tension plates.

Figure 2:
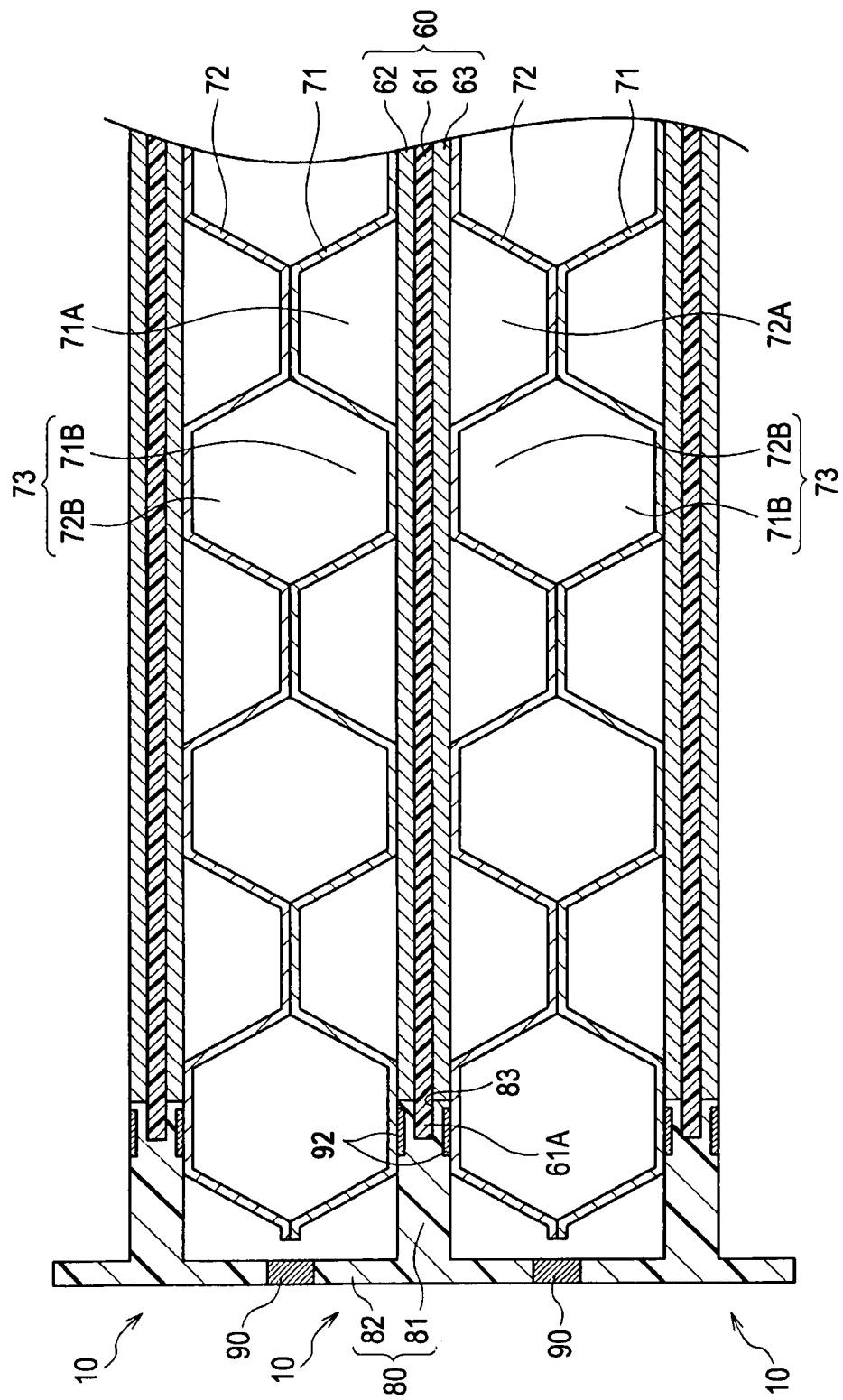
FIG. 2 is a partial sectional view of adjacent single cells in the stacking direction.

Referring to FIG. 2, the structure of the single cell 10 is described. FIG. 2 is a partial sectional view of adjacent single cells 10 in the stacking direction. Each of the single cells 10 includes an MEA 60, an anode separator 71 and a cathode separator 72 sandwiching the MEA 60 therebetween, and an insulation member 80 integrally formed with the MEA 60.

The MEA 60 is a layered stack including an electrolyte membrane 61, an anode electrode 62 disposed on one surface of the electrolyte membrane 61, and a cathode electrode 63 disposed on the other surface of the electrolyte membrane 61.

The electrolyte membrane 61 is a proton-conductive ion exchange membrane made of fluorocarbon resin. The electrolyte membrane 61 is larger than the anode electrode 62 and the cathode electrode 63, so that the electrolyte membrane 61 has an outer edge 61A which extends past the outer edges of the anode electrode 62 and the cathode electrode 63. Because the electrolyte membrane 61 conducts electricity well in a wet condition, the anode gas and the cathode gas are humidified in the fuel cell stack 100.

The anode electrode 62 is a stack of layers including an electrode catalyst layer made of an alloy including platinum or the like, a water-repellent layer made of fluorocarbon resin or the like, and a gas diffusion layer made of a carbon cloth or the like, which are stacked on the electrolyte membrane 61 in this order.

As with the anode electrode 62, the cathode electrode 63 is a stack of layers including an electrode catalyst layer, a water-repellent layer, and a gas diffusion layer, which are stacked on the electrolyte membrane 61 in this order.

The anode separator 71 is a corrugated panel of electroconductive material such as metal. The anode separator 71 is larger than the MEA 60. On the side of the anode separator 71 which contacts the anode electrode 62, an anode gas passage 71A for supplying anode gas to the anode electrode 62 is formed between the anode separator 71 and the anode electrode 62. On the opposite side of the anode separator 71, a cooling water channel 71B, through which cooling water for cooling the fuel cell stack 100 flows, is formed between the anode separator 71 and the cathode separator 72.

The cathode separator 72 is a corrugated panel made of electroconductive material such as metal. The cathode separator 72 is larger than the MEA 60. On the side of the cathode separator 72 which contacts the cathode electrode 63, a cathode gas passage 72A for supplying the cathode gas to the cathode electrode 63 is formed between the cathode separator 72 and the cathode electrode 63. On the opposite side of the cathode separator 72, a cooling water channel 72B, through which cooling water for cooling the fuel cell stack 100 flows, is formed between the cathode separator 72 and the anode separator 71.

The cooling water channel 71B, which is formed by the anode separator 71 of one of a pair of adjacent single cells 10, and the cooling water channel 72B, which is formed by the cathode separator 72 of the other one of the pair of adjacent single cells 10, face each other. The cooling water channels 71B and 72B constitute a cooling water channel 73.

The insulation member 80, which is made of electrically insulating resin, is a frame-shaped member disposed along the outer periphery of the MEA 60. The insulation member 80 includes a frame portion 81 integrally formed with the outer periphery of the MEA 60, and a protruding portion 82 protruding from the frame portion 81 in the stacking direction.

The protruding portions 82 of the insulation member 80 jut out from an end of the frame portion 81 both ways in the stacking direction (vertical directions in FIG. 2). The protruding portion 82 of the insulation member 80 of one of a pair of adjacent single cells 10 and the protruding portion 82 of the insulation member 80 of the other one of the pair of single cells 10 are bonded to each other via a first displacement absorbing member 90. In one embodiment, the first displacement absorbing members 90 are bonding members.

In the frame portion 81 of the insulation member 80, a slot 83 is formed so that the outer edge 61A of the electrolyte membrane 61 can be inserted therein. The frame portion 81 is sandwiched between the anode separator 71 and the cathode separator 72 of the single cell 10, and bonded to the anode separator 71 and the cathode separator 72 via second displacement absorbing members 92. In one embodiment, the second displacement absorbing member 92 are bonding members.

The first displacement absorbing members 90, with which the space between the insulation members 80 is filled, and the second displacement absorbing members 92, with which the insulation member 80 is bonded to the separators 71 and 72, can be adhesives having a Young's modulus lower than that of the insulation member 80 when the adhesives are cured. It is preferable that the Young's modulus of the first displacement absorbing members 90 and the second displacement absorbing members 92 is equal to or lower than 20 MPa.

Since the fuel cell stack 100 includes the insulation members 80 covering the outer peripheries of the single cells 10, insulation between the inside and the outside of the fuel cell stack 100 can be ensured.

Figure 3A:
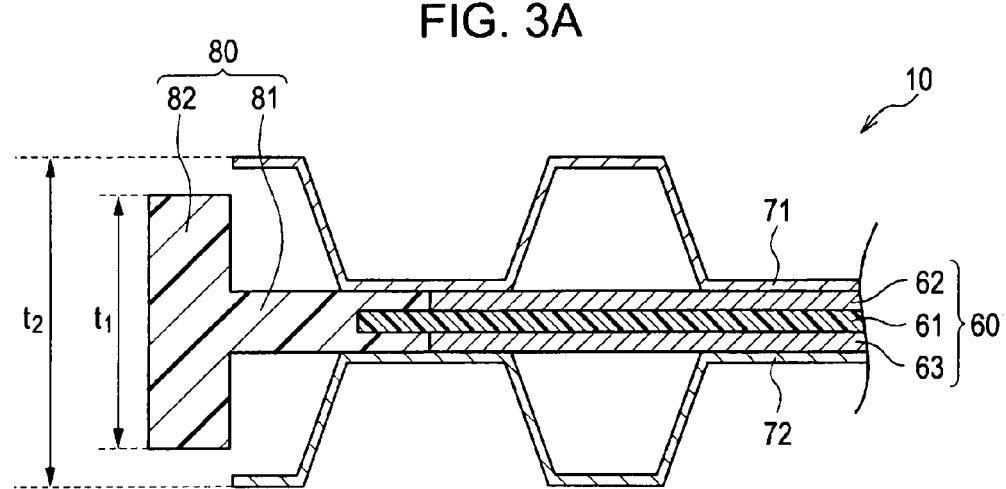
FIGS. 3A and 3B illustrate the relationship between the thickness of a single cell in the stacking direction and the thickness of a protruding portion of an insulation member in the stacking direction.
Figure 3B:
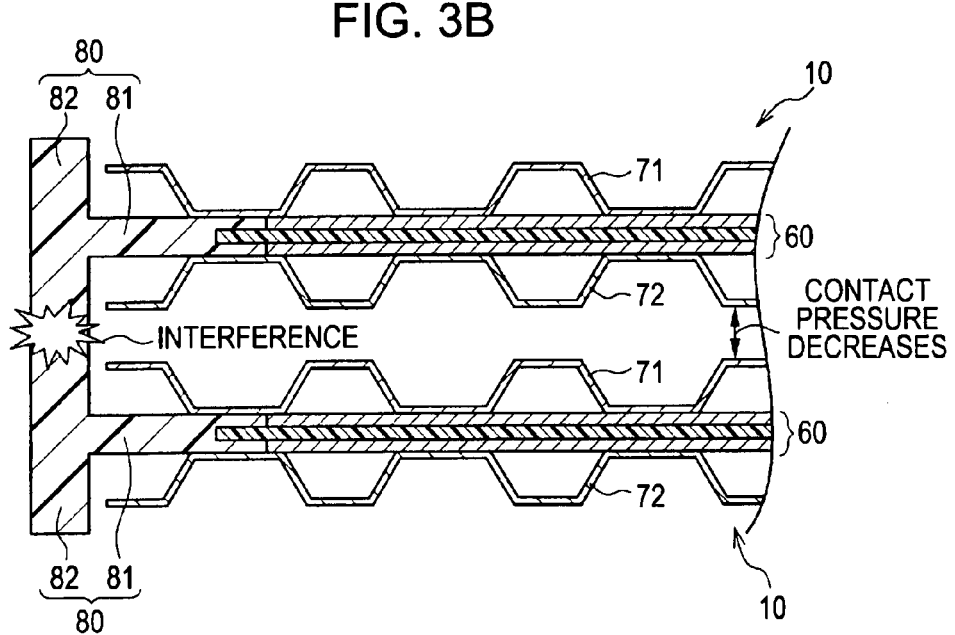

As shown in FIG. 3A, the thickness $t1$ of the protruding portion 82 of the insulation member 80 of the single cell 10 in the stacking direction is smaller than the thickness $t2$ of the single cell 10 in the stacking direction. The thickness $t2$ of the single cell 10 in the stacking direction is the sum of the thickness of the MEA 60 in the stacking direction, the thickness of the anode separator 71 in the stacking direction, and the thickness of the cathode separator 72 in the stacking direction. If, for example, the thickness t1 of the protruding portion 82 of the insulation member 80 in the stacking direction is larger than the thickness t2 of the single cell 10 in the stacking direction as shown in FIG. 3B, the insulation members 80 of adjacent single cells 10 interfere with each other, so that the contact pressure between the single cells 10 decreases, which may impair power generation efficiency. In the present embodiment, the thickness t1 of the protruding portion 82 in the stacking direction is smaller than the thickness t2 of the single cell 10 in the stacking direction. Therefore, the insulation members 80 of adjacent single cells 10 do not interfere with each other, whereby power generation efficiency is less likely to be impaired.

Figure 4A:
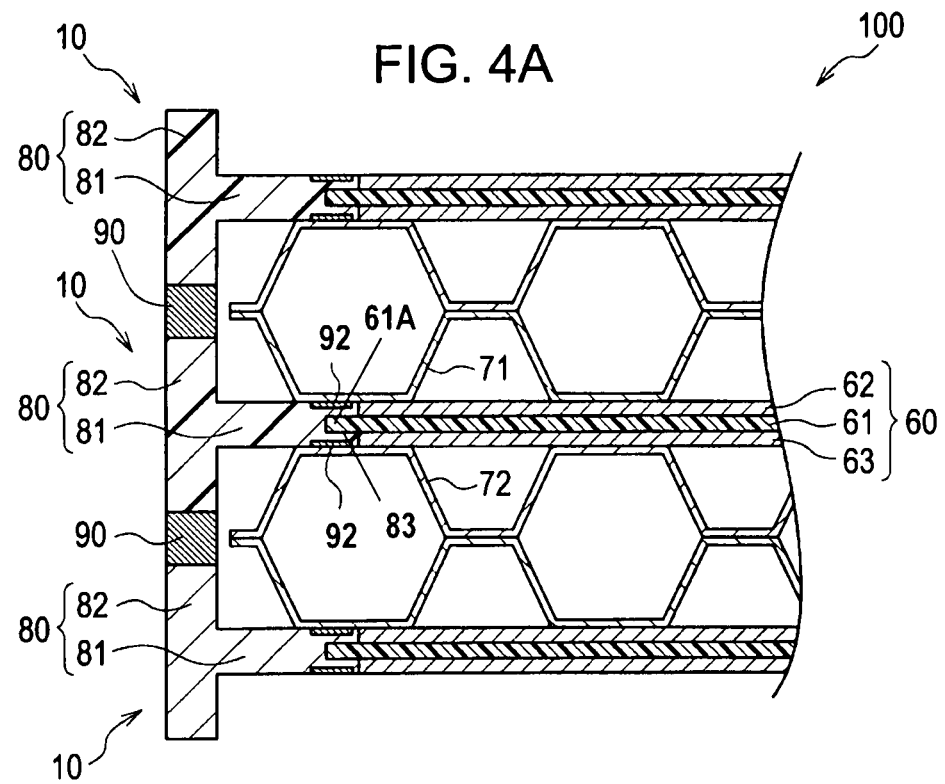
FIGS. 4A and 4B illustrate the sealing ability of the fuel cell stack against water vapor generated in an MEA.
Figure 4B:
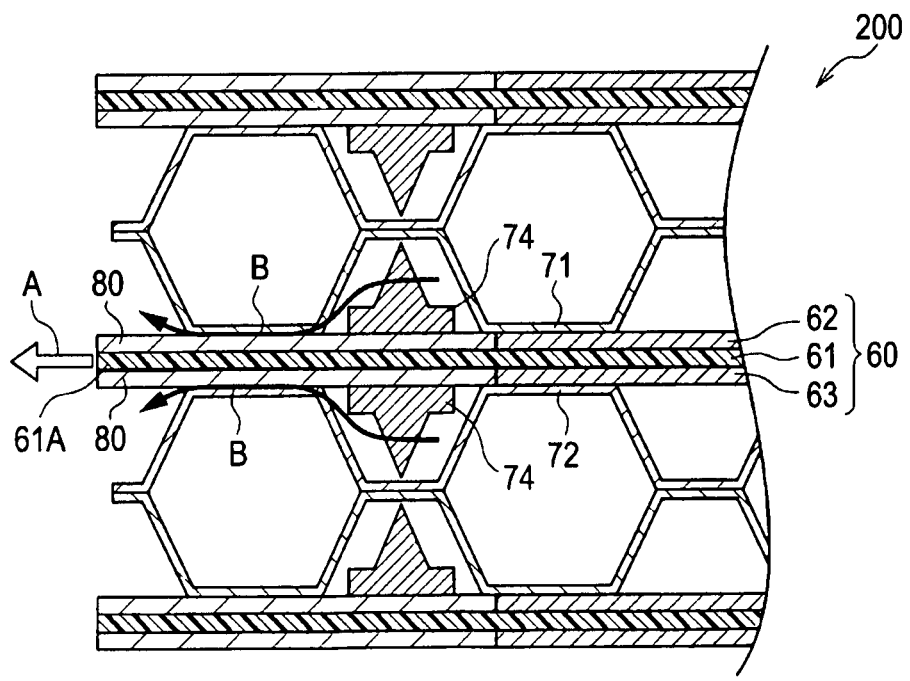

FIGS. 4A and 4B illustrate the sealing ability of a fuel cell stack against water vapor generated in an MEA. FIG. 4A shows the fuel cell stack 100 of the present embodiment, and FIG. 4B shows a fuel cell stack 200 of a comparative example.

In the fuel cell stack 200 shown in FIG. 4B, insulation members 80 are disposed so as to sandwich an outer edge 61A of an electrolyte membrane 61 of a single cell 10 therebetween, whereby the outer periphery of an electrolyte membrane 61 is exposed to the outside. Thus, as shown by the arrow A, water vapor generated in an MEA 60 can be easily released to the outside from between the electrolyte membrane 61 and the insulation members 80. Moreover, in the fuel cell stack 200, rubber gaskets 74 are disposed between the insulation members 80 and the separators 71 and 72. Because the rubber gaskets 74 are permeable to water vapor, water vapor generated in the MEA 60 may leak to the outside from between the insulation members 80 and the separators 71 and 72 as shown by the arrow B.

In contrast, in the fuel cell stack 100 of the present embodiment shown in FIG. 4A, the outer edge 61A of the electrolyte membrane 61 of the single cell 10 is inserted into the slot 83 of the frame portion 81 of the insulation member 80, and the frame portion 81 is bonded to the separators 71 and 72 via the second displacement absorption members 92, whereby water vapor generated in the MEA 60 is restrained from passing between the insulation member 80 and the separators 71 and 72. Moreover, in the fuel cell stack 100, the space between the protruding portions 82 of the insulation members 80 of adjacent single cells 10 is filled with the first absorption displacement member 90, so that the inside of the fuel cell stack 100 is separated from the outside by the insulation members 80 and the first displacement absorbing members 90. Thus, even if water vapor passes between the insulation member 80 and the separators 71 and 72, the water vapor is prevented from leaking to the outside.

When the fuel cell generates power, the electrolyte membranes 61 of the MEAs 60 swell, so that the fuel cell stack 100 expands in the stacking direction. FIGS. 5A to 5E illustrate states of an insulation member when the fuel cell stack expands in the stacking direction.

FIG. 5C shows a fuel cell stack 300, which is a comparative example of the fuel cell stack 100. In the fuel cell stack 300, protruding portions 82 of insulation members 80 of adjacent single cells 10 are connected to each other via a first displacement absorbing member 90 having a Young's modulus higher than that of the insulation members 80. FIG. 5D shows a fuel cell stack 300, which is a comparative example of the fuel cell stack 100. In the fuel cell stack 300, protruding portions 82 of insulation members 80 of single cells 10 are integrally formed with each other. With the fuel cell stack 300 shown in FIGS. 5C and 5D, the insulation members 80 and the first displacement absorbing members 90 may not be able to follow displacement of the fuel cell stack (displacements between a plurality of MEAs 60) in the stacking direction, which may occur during power generation or on other occasions. Causes of displacement include, but are not limited to, swelling of the MEAs 60 and vibration of the fuel cell stack 300 for example in a moving automotive vehicle subjected to unevenness in the road. Therefore, the protruding portion 82 of the insulation member 80, for example, may crack as shown in FIG. 5E.

In contrast, in the fuel cell stack 100 shown in FIG. 5A, the protruding portions 82 of the insulation members 80 of adjacent single cells 10 are bonded to each other via the first displacement absorbing member 90 having a lower Young's modulus than the insulation members 80. As shown in FIG. 5B, the first displacement absorbing member 90 deforms so that the insulation member 80 can follow displacement of the fuel cell stack in the stacking direction, whereby the insulation member 80 is restrained from cracking.

Accordingly, the fuel cell stack 100 of the present embodiment has the following advantages.

In the fuel cell stack 100, the space between the protruding portions 82 of the insulation members 80 of adjacent single cells 10 is filled with the first displacement absorbing member 90. Even when the electrolyte membrane 61 of the MEA 60 swells, the first displacement absorbing member 90 deforms so that the insulation member 80 can follow the displacement of the fuel cell in the stacking direction, whereby the insulation member 80 is restrained from cracking. Therefore, water vapor generated in the fuel cell stack 100 does not leak to the outside and generation of a liquid junction is suppressed, whereby the insulation performance of the fuel cell stack 100 is restrained from deteriorating.

In the fuel cell stack 100, the frame portion 81 of the insulation member 80 is integrally formed with the outer periphery of the MEA 60. Thus, as compared with the fuel cell stack 200 shown in FIG. 4B, in which the outer edge 61A of the electrolyte membrane 61 is sandwiched between the insulation members 80, the area of the electrolyte membrane 61 that swells can be decreased. Therefore, with the fuel cell stack 100, the displacement of the fuel cell stack in the stacking direction due to swelling of the electrolyte membrane 61 can be reduced as compared with the fuel cell stack 200, whereby the insulation member 80 is more securely restrained from cracking.

In the fuel cell stack 100, the space between the protruding portions 82 of the insulation members 80 of adjacent single cells 10 is filled with the first displacement absorbing member 90, so that the inside of the fuel cell stack 100 is separated from the outside. Thus, water vapor generated in the MEA 60 does not leak out of the fuel cell stack 100. Moreover, in the fuel cell stack 100, the outer edge 61A of the electrolyte membrane 61 of the single cell 10 is inserted into the slot 83 of the frame portion 81 of the insulation member 80, and the frame portion 81 of the insulation member 80 is bonded to the separators 71 and 72 via the second displacement absorbing member 92. Thus, water vapor generated in the MEA 60 is restrained from passing between the insulation member 80 and the separators 71 and 72. In this manner, water vapor is restrained from leaking to the outside without using gaskets or the like, whereby the number of components and the size of the fuel cell stack 100 can be reduced.

Second Embodiment

FIG. 6 is a partial sectional view of single cells 10 of a fuel cell stack 100 of a second embodiment in the stacking direction.

The fuel cell stack 100 of the second embodiment, which is similar to that of the first embodiment, differs from that of the first embodiment in that the stacked state of the single cells 10 is firmly held in the second embodiment. The difference is mainly described below.

The fuel cell stack 100 includes a stack of the single cells 10 each including an insulation member 80, and the stack of the single cells are sandwiched between end plates 40 in the stacking direction. Thus, the rigidity of the fuel cell stack 100 in a direction perpendicular to the stacking direction is lower than the rigidity of the fuel cell stack 100 in the stacking direction. Therefore, when a force is applied to the fuel cell stack 100 from the outside in a direction perpendicular to the stacking direction, the single cells 10 may be moved in the direction perpendicular to the stacking direction. If the single cells 10 are moved by a large distance, the insulation member 80 and the first displacement absorbing member 90 may not be able to follow the movement of the single cells 10, whereby the insulation member 80 and the first displacement absorbing member 90 may crack.

In order to prevent this, as shown in FIG. 6, the fuel cell stack 100 includes a pair of tie rods 84 so that the single cell 10 can be restrained from moving.

The tie rods 84 extend in the stacking direction along the outer peripheral surfaces of the protruding portions 82 of the insulation members 80 of the stack of the single cells 10. The tie rods 84 are fixed to the end plates 40. The pair of tie rods 84 are disposed so as to face each other and sandwich the single cells 10 therebetween from outer sides of the insulation members 80.

The fuel cell stack 100 of the second embodiment includes the pair tie rods 84, which are disposed on the outer sides of the stack of the single cells 10 and extend in the stacking direction. Thus, even when a force is applied from the outside in a direction perpendicular to the stacking direction, the single cells 10 are restrained from moving in the direction perpendicular to the stacking direction. Since the single cells 10 are restrained from moving in the direction perpendicular to the stacking direction, the first displacement absorbing member 90 can deform so that the insulation members 80 can follow movement of the single cells 10. Thus, the insulation members 80 and the first displacement absorbing members 90 are restrained from cracking. Therefore, water vapor generated in the fuel cell stack 100 does not leak to the outside, generation of a liquid junction is suppressed, and the insulation performance of the fuel cell stack 100 is restrained from deteriorating.

Third Embodiment

Figure 7:
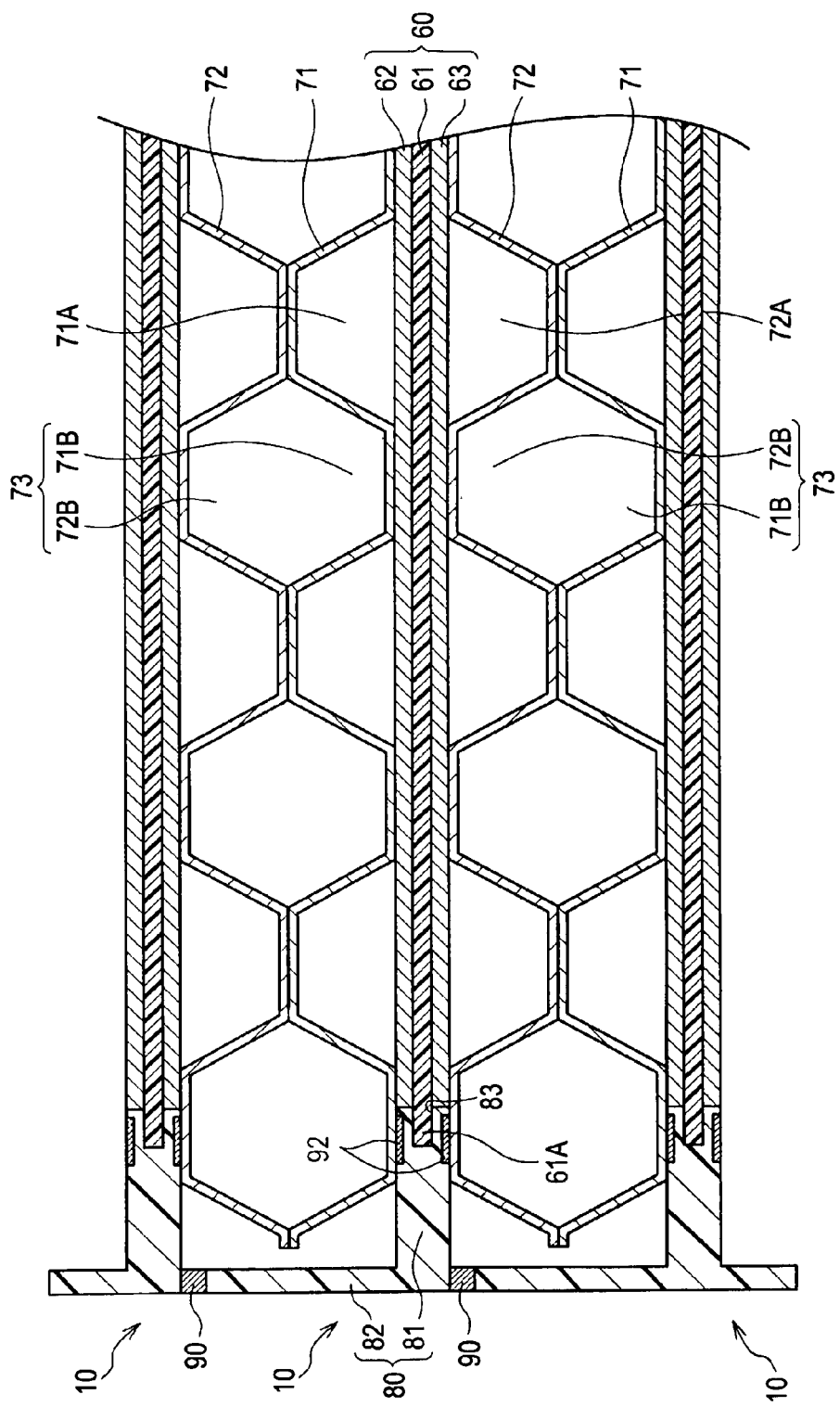
FIG. 7 is a partial sectional view of single cells of a fuel cell stack of a third embodiment in the stacking direction.

FIG. 7 is a partial sectional view of single cells 10 of a fuel cell stack 100 of a third embodiment in the stacking direction.

The fuel cell stack 100 of the third embodiment, which is similar to that of the first embodiment, differs from that of the first embodiment in the structure of insulation members 80 of the single cells 10. The difference is mainly described below.

In the third embodiment, a protruding portion 82 of the insulation member 80 of the single cell 10 protrudes from an end of the frame portion 81 one way in the stacking direction (upward in FIG. 7). In order to absorb displacement of the fuel cell stack, a space between the protruding portion 82 of the insulation member 80 of one of a pair of adjacent single cells 10 and an end of the frame portion 81 of the insulation member 80 of the other one of the pair of adjacent single cells 10 is filled with a first displacement absorbing member 90.

Also with the fuel cell stack 100 of the third embodiment, the first displacement absorbing member 90 deforms so that the insulation member 80 can follow the displacement of the fuel cell stack in the stacking direction, whereby the advantage similar to that of the first embodiment can be gained.

Moreover, in the fuel cell stack 100 of the third embodiment, the first displacement absorbing member 90, which deforms in accordance with the displacement of the fuel cell stack, is disposed farther from ends of the anode separator 71 and the cathode separator 72 in the stacking direction than in the first embodiment. Therefore, when the first displacement absorbing member 90 deforms so that the insulation member 80 can follow the displacement of the fuel cell stack, the insulation member 80 and the ends of the separators 71 and 72 are prevented from colliding with or shifting with respect to each other, whereby the insulation member 80 is restrained from cracking.

While the invention has been disclosed with reference to certain preferred embodiments, numerous modifications, alterations, and changes to the described embodiments are possible without departing from the sphere and scope of the invention, as defined in the appended claims and equivalents thereof.

For example, the advantages of the above-described embodiments can be obtained by using displacement absorbing means such as an elastic member made from rubber or other like material instead of the bonding member as the first displacement absorbing 90. Moreover, in each of the first to third embodiments, the fuel cell stack 100 is made by simultaneously stacking all the single cells 10. However, some of the single cells 10 may be stacked beforehand to form a cell module, and a plurality of cell modules may be stacked so as to form the fuel cell stack 100. With this structure, the number of man-hours required for assembling the fuel cell stack can be reduced.

Accordingly, it is intended that the invention not be limited to the described embodiments, but that it have the full scope defined by the language of the following claims.

What is claimed is:

1. A fuel cell stack having a plurality of single cells, each including a membrane electrode assembly, that are stacked in a stacking direction, the fuel cell stack comprising:

an anode separator and a cathode separator sandwiching the membrane electrode assembly of each single cell therebetween, wherein the anode separator is a corrugated panel of electroconductive material forming a gas passage for supplying anode gas to the anode, on the side of the anode separator which contacts an anode, and forming a cooling water channel, on the opposite side other anode separator, through which cooling water flows, and wherein the cathode separator is a corrugated panel of electroconductive material forming a gas passage for supplying cathode gas to the cathode, on the side of the cathode separator which contacts a cathode, and forming a cooling water channel, on the opposite side of the cathode separator, through which cooling water flows;

a plurality of insulation members each connected to an outer peripheral portion of a corresponding one of the membrane electrode assemblies, the plurality of insulation members being electrically insulating, wherein each insulating member has a portion extending in a plane perpendicular to the stacking direction and a pair of protruding portions extending opposite to one another along the stacking direction; and a first plurality of displacement absorbing members each of which being disposed between each pair of adjacent insulation members between corresponding producing portions directly in contact with the corresponding protruding portions, wherein each displacement absorbing member is configured to deform so that insulating members can follow displacement of the fuel cell stack in the stacking direction.

2. The fuel cell stack according to claim 1, wherein the Young's modulus of each of the plurality of first displacement absorbing members is lower than the Young's modulus of the insulation members.

3. The fuel cell stack according to claim 1, wherein each of the plurality of first displacement absorbing members are bonding members bonding adjacent insulation members to each other.

4. The fuel cell stack according claim 1, wherein each of the insulation members includes a frame portion formed along an outer periphery of the membrane electrode assembly.

5. The fuel cell stack according to claim 4,
wherein the thickness of the protruding portion in the stacking direction is smaller than the sum of the thickness of the membrane electrode assembly in the stacking direction and the thickness of the pair of separators in the stacking direction.

6. The fuel cell stack according to claim 4, wherein the membrane electrode assembly includes an electrolyte membrane, and wherein the frame portion defines a slot into which an outer edge of the electrolyte membrane is inserted.

7. The fuel cell stack according to claim 4, further comprising:
a second plurality of displacement absorption members each disposed between the frame portion and the separators.

8. The fuel cell stack according to claim 7, wherein the Young's modulus of each of the plurality of second displacement absorbing members is lower than the Young's modulus of the insulation members.

9. The fuel cell stack according to claim 8, wherein each of the plurality of second displacement absorbing members are bonding members bonding the frame portion to the separators.

10. The fuel cell stack according to claim 1, further comprising a pair of tie rods extending in the stacking direction and sandwiching the single cells therebetween from outer sides of the insulation members.

11. A fuel cell stack having a plurality of single cells, each including a membrane electrode assembly including an electrolyte membrane, that are stacked in a stacking direction, the fuel cell comprising:
an anode separator and a cathode separator sandwiching the membrane electrode assembly of each single cell therebetween,
wherein the anode separator is a corrugated panel of electroconductive material forming a gas passage for supplying anode gas to the anode, on the side of the anode separator which contacts an anode, and forming a cooling water channel, on the opposite side of the anode separator, through which cooling water flows, and
wherein the cathode separator is a corrugated panel of electroconductive material forming a gas passage for supplying cathode gas to the cathode, on the side of the cathode separator which contacts a cathode, and forming a cooling water channel, on the opposite side of the cathode separator, through which cooling water flows; and
outer peripheral members configured and arranged to deform so as to allow displacement between the plurality of single cells along the stacking direction, each of the outer peripheral members being connected to an outer peripheral portion of a corresponding one of the plurality of membrane electrode assemblies,
wherein each of the outer peripheral members includes an insulation member that is electrically insulating and a displacement absorbing member that absorbs displacement,
wherein each the insulation member has a portion extending in a plane perpendicular to the stacking direction, and a pair of protruding portions extending opposite to one another along the stacking direction, and
wherein the displacement absorption member is disposed between corresponding protruding portions of the insulation members of adjacent outer peripheral members directly in contact with the corresponding protruding portions.

12. The fuel cell stack according to claim 11, wherein the Young's modulus of the displacement absorption member is lower than the Young's modulus of the insulation member.

13. The fuel cell stack according to claim 11, wherein the displacement absorption member is a bonding member bonding the insulation members to each other.

14. The fuel cell stack according claim 11, wherein each of the insulation members includes a frame portion formed along an outer periphery of the membrane electrode assembly.

15. A fuel cell stack comprising:
a plurality of single cells, each including a membrane electrode assembly;
an anode separator and a cathode separator sandwiching the membrane electrode assembly of each single cell therebetween,
wherein the anode separator is a corrugated panel of electro conductive material forming a gas passage for supplying anode gas to the anode, on the side of the anode separator which contacts the anode, and forming a cooling water channel, on the opposite side of the anode separator, through which cooling water flows, and
wherein the cathode separator is a corrugated panel of electroconductive material forming a gas passage for supplying cathode gas to the cathode, on the side of the cathode separator which contacts the cathode, and forming a cooling water channel, on the opposite side of the cathode separator, through which cooling water flows; and
outer peripheral members configured and arranged to deform so as to allow displacement between the plurality of single cells along stacking direction, each of the outer peripheral members being connected to an outer peripheral portion of a corresponding one of the plurality of membrane electrode assemblies,
wherein each of the outer peripheral members includes an insulation member that is electrically insulating and a displacement absorbing member that absorbs displacement,
wherein each insulation member has a portion extending in a plane perpendicular to the stacking direction and a pair of protruding portions extending opposite to one another along the stacking direction, and
wherein the displacement absorption member is disposed between corresponding protruding portions of the insulation members of adjacent outer peripheral members directly in contact with the corresponding protruding portions.

* * * * *